United States Patent [19]

Mazhar

[11] Patent Number: 5,392,516
[45] Date of Patent: Feb. 28, 1995

[54] METHOD FOR FORMING A SPOOL VALVE SLEEVE

[75] Inventor: Mohammad S. Mazhar, Macomb County, Mich.

[73] Assignee: The United States of America as represented by the Secretary of the Army, Washington, D.C.

[21] Appl. No.: 245,794

[22] Filed: May 19, 1994

[51] Int. Cl.6 .............................................. B23P 15/00
[52] U.S. Cl. ................... 29/890.13; 29/421.1; 29/890.132; 29/890.128
[58] Field of Search ............. 29/890.13, 890.135, 29/890.132, 890.128, 421.1, 557; 137/625.34, 625.69

[56] References Cited

U.S. PATENT DOCUMENTS

| | | | |
|---|---|---|---|
| 3,081,794 | 3/1963 | Lucien | 137/625.69 |
| 3,648,733 | 3/1972 | Hahn et al. | 137/625.69 |
| 4,182,375 | 1/1980 | Fukano et al. | 137/625.69 |
| 4,896,409 | 1/1990 | Rosch et al. | 29/890.128 |
| 5,293,685 | 3/1994 | Meyer et al. | 137/625.69 |

FOREIGN PATENT DOCUMENTS 6109148  4/1994  Japan ................. 137/625.34

*Primary Examiner*—Irene Cuda
*Attorney, Agent, or Firm*—Peter A. Taucher; David L. Kuhn

[57] ABSTRACT

A valve sleeve is made from a tube having smooth inner and outer diametrical surfaces by forming a shallow channel on the tube so that a channelled region of the tube is thinner than other regions of the tube. The tube is confined in a sleeve whose inner peripheral surface conforms with the tube's outer diametrical surface, but the sleeve's inner peripheral surface also defines a gap with the channelled region of the tube. Next, the tube is pressurized to deform the channelled region outward into the gap. As a result, there are both a concavity on the inner diametrical surface of the tube and a smoothly surfaced transition between the concavity and the other regions. Finally, the tube is removed from the sleeve and a port aperture is drilled in the radially outer part of the concavity. As an alternate method, a tube of constant tube wall thickness may be placed in an internally channelled confinement and then pressurized so as to distend regions of the tube wall outward. The tube is removed from the sleeve and holes are drilled in the distended regions.

14 Claims, 7 Drawing Sheets

METHOD FOR FORMING A SPOOL VALVE SLEEVE

GOVERNMENT USE

The invention described herein may be manufactured, used and licensed by or for the U.S. Government for governmental purposes without paying me of a royalty.

BACKGROUND

FIG. 1 shows a sleeve 2 and spool 4 of a conventional spool valve where the sleeve has ports 6 and spool has annular seals 8 compressed against inner peripheral wall 10 of sleeve 2. Ports 6 are typically drilled holes having sharp edges 12 at inner wall 10, edges tend to cut or otherwise damage seals 8 as these seals pass the ports. The interaction of seals 8 with edges 12 is seen in FIGS. 2 and 2A. Counterbored holes 14 (FIG. 2B) are often used to reduce seal damage in spool valves. Counterbore 16 of hole 14 is cut by a tool inserted axially through sleeve 2, the tool having a radially oriented cutting head aligned with hole 14. Machining a counterbore by this method is feasible but is relatively slow and expensive.

SUMMARY OF THE INVENTION

My method is an inexpensive process to make valve sleeves which avoids seal damage due to sharp edges at valve port holes. First, a straight cylindrical metal tube is provided with smooth inner and outer diametrical surfaces. A cross-sectionally flat channel is cut into the tube so that the tube's channelled part is radially thinner than other parts of the tube. The tube is then confined in a sleeve whose inner peripheral surface conforms to the unchannelled portion of the tube's outer surface and defines a gap with the channelled part. The tube is next sealed and pressurized to deform the channelled region outward into the gap, thereby forming a concavity on the inner surface of the tube. A smoothly surfaced transition is integrated between the concavity and the unchannelled portions of the tube. This transition replaces the counterbore of conventional spool valve sleeves. After deforming, the tube is removed from the sleeve and a valve port aperture is drilled in the radially outer part of the concavity. In an alternate method, a tube of constant wall thickness is confined in an internally channelled sleeve and then pressurized to outwardly distend the regions of the tube at the sleeve's channels. The tube is removed from the sleeve and holes are drilled in the distended regions.

DETAILED DESCRIPTION

Figure 1:
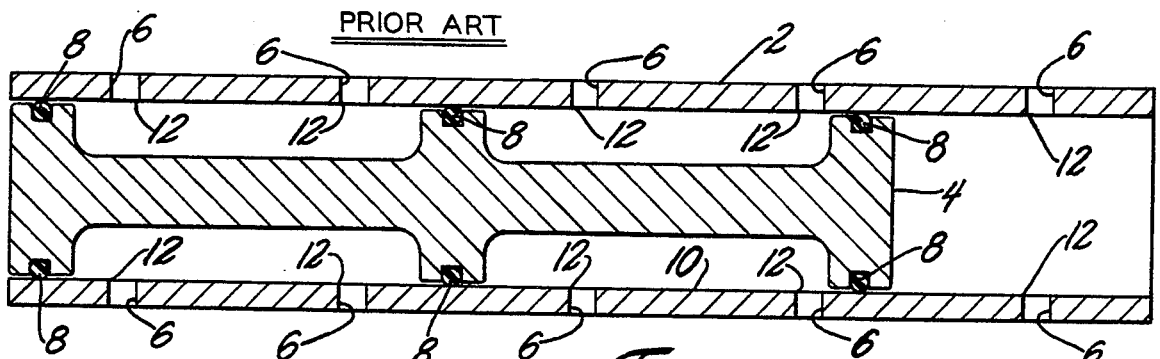
FIGS. 1 and 2 are sectional views of a conventionally made spool valve.
Figure 2:
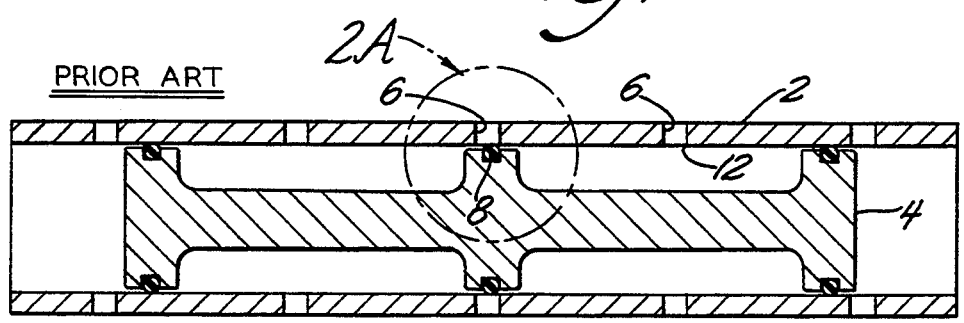
Figure 2A:
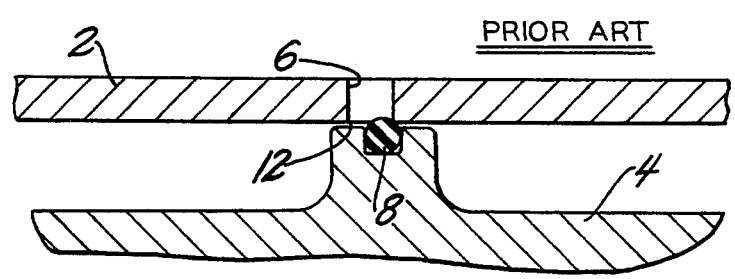
FIG. 2A is an enlargement of a detail of FIG. 2.
Figure 2B:
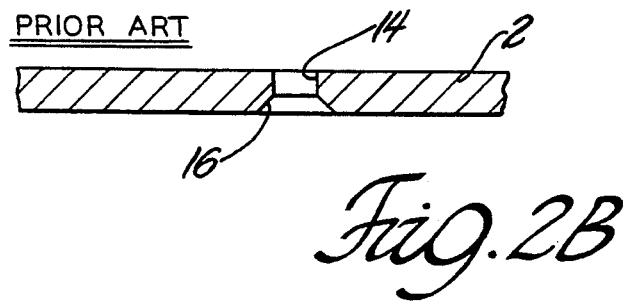
FIG. 2B is a sectional view illustrating a conventional valve port counterbore.
Figure 3:
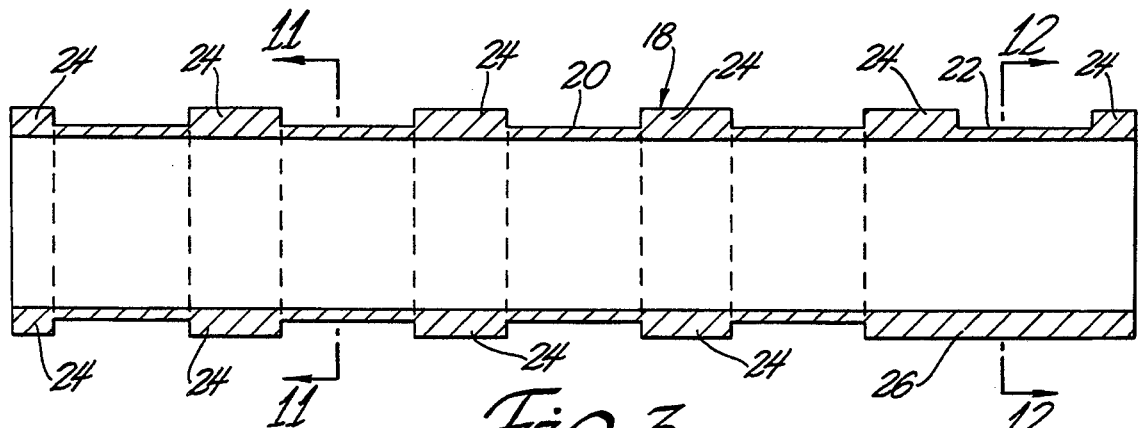
FIG. 3 is a sectional view of a tube having external channels formed as part of my method.
Figure 10:
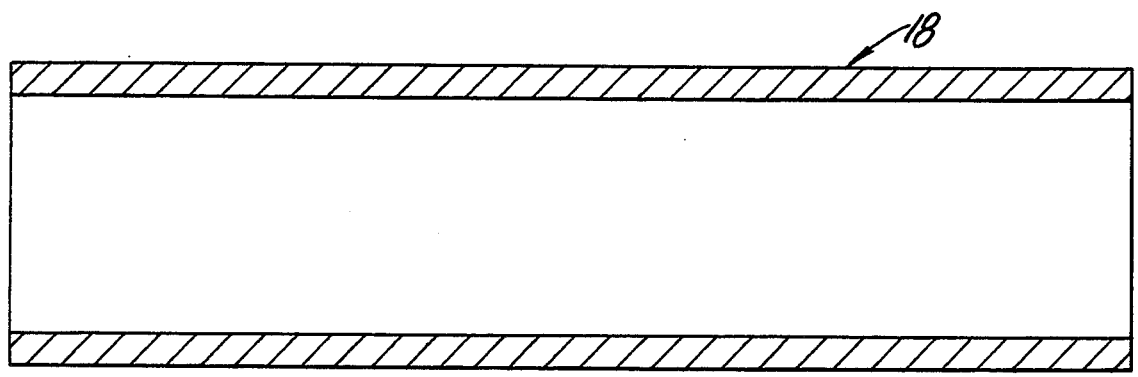
FIG. 10 is a sectional view of a tube from which a valve sleeve is made by my method.
Figure 11:
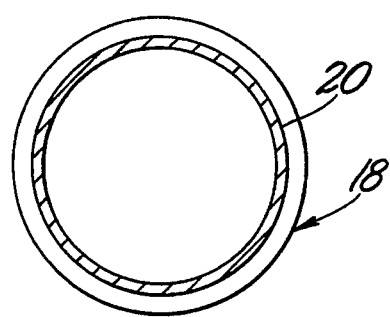
FIGS. 11 and 12 are views taken along line 11—11 and 12—12 respectively in FIG. 3.
Figure 12:
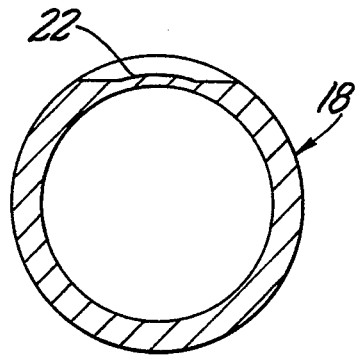

My method to make a spool valve sleeve starts with an open ended straight cylindrical metal tube or sleeve 18 in FIG. 10, sleeve 18 having smooth inner and outer diametrical surfaces. Annular channels 20 are machined or otherwise formed upon the outer diametrical surface of sleeve 18, these channels preferably being wide and flat in transverse cross section as best seen in FIG. 3. Alternately, angularly shorter arcuate channels 22 in FIGS. 3 and 12 can be on the sleeve's exterior where a port through the sleeve will located. Preferably, channels 22 are wide and flat in transverse cross section as seen in FIG. 3.

Figure 4:
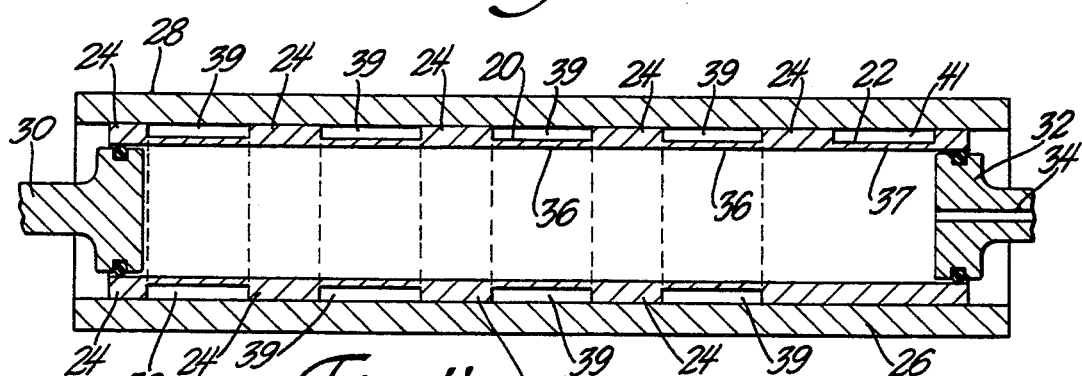
FIG. 4 is a sectional view of the externally channelled tube closely fit in a confinement sleeve.

Valve sleeve 18 is inserted concentrically into outer confinement sleeve 28 (FIG. 4), with which larger diameter regions 24 and 26 of sleeve 18 conform. The cylindrical wall of sleeve 28 is thicker and stronger than the cylindrical wall of sleeve 18. The ends of valve sleeve 18 are then closed and sealed by plugs 30 and 32, and duct 34 in plug 32 admits pressurized fluid to now-sealed sleeve 18. When this fluid enters sleeve 18, relatively thinner zones 36 and 37 of sleeve 18 are plastically deformed radially outward into gaps 39 and 41. Due to support by outer sleeve 28, larger diameter regions 24 and 26 deform elastically only and also deform much less than the adjacent thinner zones.

I envision sleeve deformation to be done without applying heat to valve sleeve 18. However, one can apply heat externally to sleeve 28 or use hot fluid to pressurize sleeve 18 or do both. If heat is applied, outer sleeve 28 will normally be of material which softens and expands less than the sleeve 18 material, at least in the temperature ranges contemplated.

Figure 5:
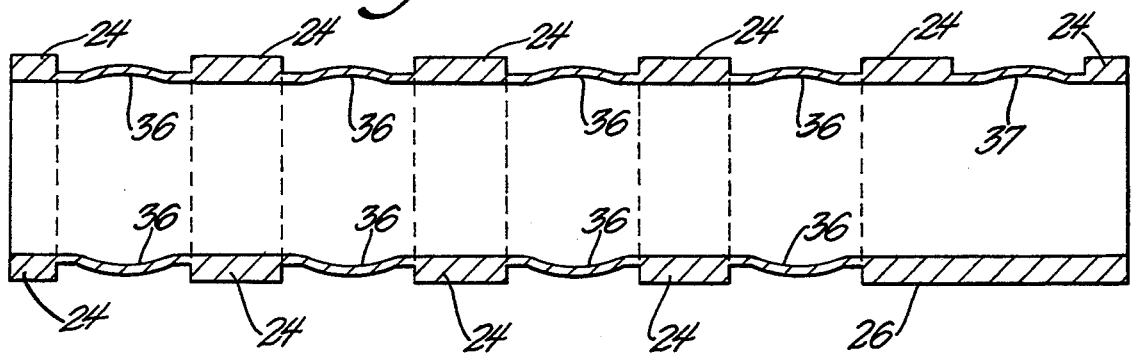
FIG. 5 is a sectional view of the tube after deformation in the confinement sleeve and removal therefrom.

Once pressure in sleeve 18 is released, sleeve 18 is removed from sleeve 28. Sleeve 18 now has the FIG. 5 configuration wherein the thinner regions 36 and 37 distend outwardly. The inner peripheral surface of sleeve 18 at regions 36 and 37 is smooth and is slightly concave relative to the interior of sleeve 18.

Figure 6:
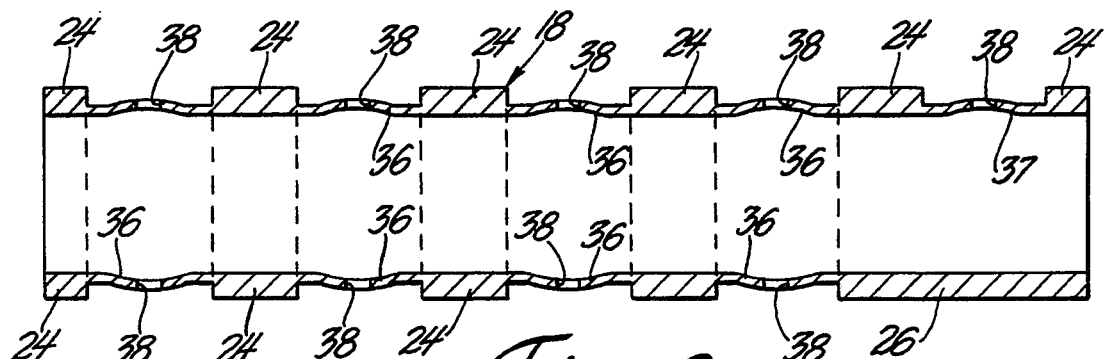
FIG. 6 is the tube as converted to a valve sleeve by adding valve ports.
Figure 7:
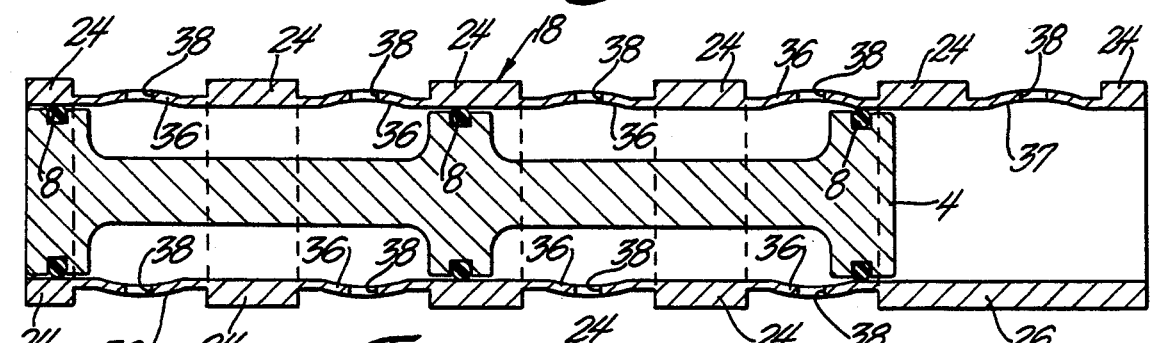
FIGS. 7 and 8 are sectional views of the valve sleeve having a valve spool therein.
Figure 8:
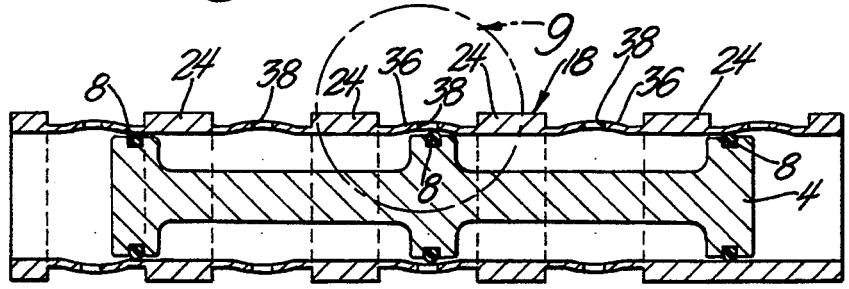
Figure 9:
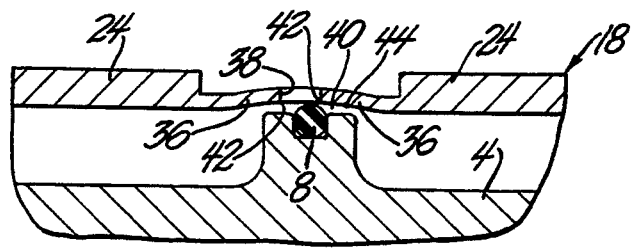
FIG. 9 is an enlarged view of a detail in FIG. 8.

Ports 38 (FIG. 6) through thinner regions 36 and 37 are drilled or formed by any other suitable method, and then spool 4 is inserted into valve sleeve 18 as seen in FIG. 7. Seals 8 of spool 4 are compressed while axially at regions 24 and 26, and seals 8 are also compressed while axially at portions of regions 36 immediately adjacent regions 24 or 26. FIGS. 8 and 9 show spool 4 moved to a position where seals 8 are axially at holes 38. As better seen in FIG. 9, each seal 8 has a very slight clearance 40 with edge 42, whereby edge 42 does not cut or abrade the seal. Region 36 slants or curves radially inward relative to spool 18 in an axial direction away from hole 38 toward one of regions 24. Thus in FIG. 9, if spool 4 carries seal 8 to the right, seal 8 will first contact region 36 at or near point 44 on the inner surface of that region. As spool 4 takes seal 8 further to the right, seal 8 increasingly compresses against region 36 and then fully compresses against the right region 24 of FIG. 9.

Figure 13:
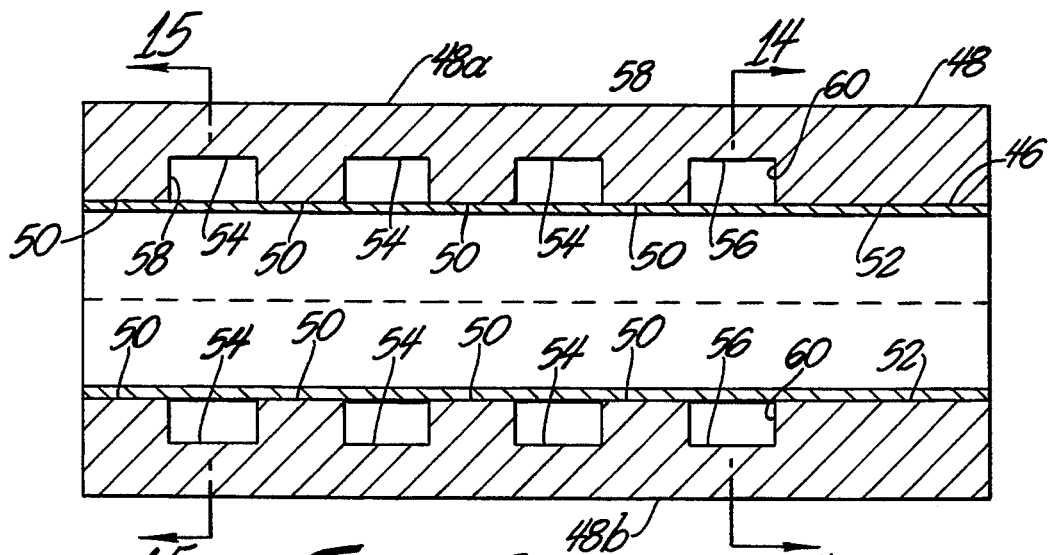
FIG. 13 is a sectional view of a tube in an internally channelled confinement sleeve used in an alternate version of my method.
Figure 14:
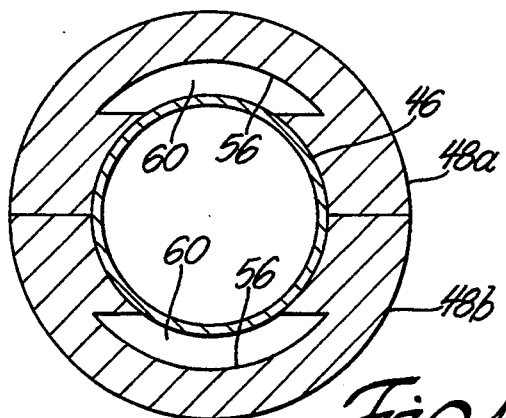
FIGS. 14 and 15 are view taken respectively along lines 14—14 and 15—15 in FIG. 13.
Figure 15:
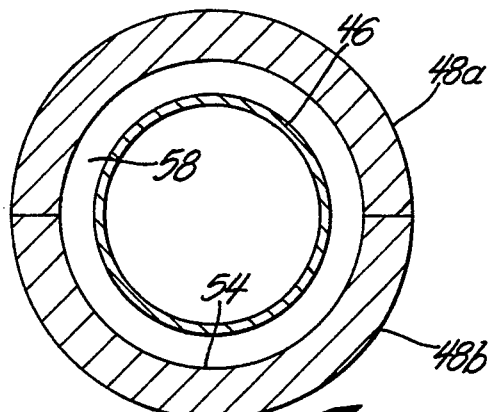

Another method to form a spool valve sleeve is explained in conjunction with FIGS. 13 through 15, where valve sleeve 46 closely fits with straight cylindrical bearing faces 50 and 52 of confinement sleeve 48. Valve sleeve 46 preferably has a uniform wall thickness. Defined in outer sleeve 48 between pairs of bearing faces 50 are inwardly open annular channels 54 whose rectangular cross sections have sidewalls 58. Also defined in sleeve 48 are a pair of essentially arcuate, cross-sectionally rectangular channels 56 between one of faces 50 and face 52, channels 56 having sidewalls 60. After valve sleeve 46 is inserted into outer sleeve 48, sleeve 46 is sealed, pressurized and shaped in the same fashion as valve 18 in FIG. 4. The two halves 48a and 48b of the outer sleeve are then separated and sleeve 46 is removed.

Figure 20:
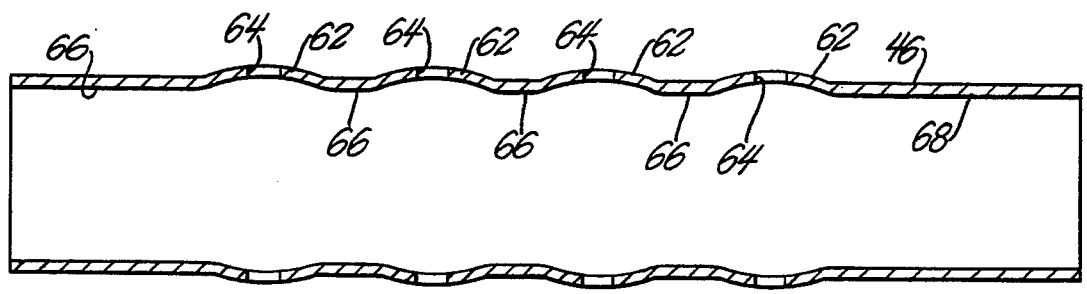
FIG. 20 is a sectional view of a valve sleeve formed by the alternate version of my method.
Figure 21:
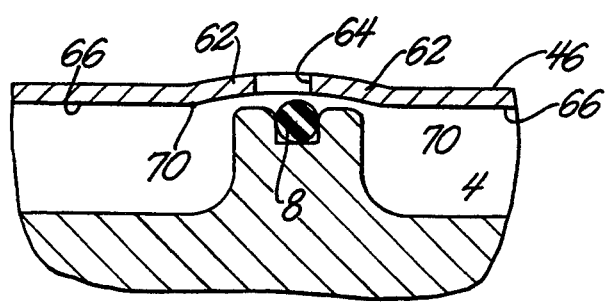
FIG. 21 is a sectional detail view showing juxtaposition of a valve seal and a port of a valve sleeve made according to the alternate version of my method.

FIG. 20 is an example of the final shape of valve sleeve 46 produced using outer confinement sleeve 48. Valve sleeve 46 has straight cylindrical regions 66 and 68 where the valve sleeve's outer diameter faced against the inner diameter of confinement sleeve 48. Between regions 66 and 68 are outward concavities or bulged regions 62, which previously axially aligned with channels 54 or 56 in confinement sleeve 46. Valve ports 64 are drilled or otherwise formed in at the center of each region 62. The juxtaposition of seal 8 and the adjoining portion of spool 4 with port 62 is shown in FIG. 21. As spool 4 moves along the longitudinal axis of sleeve 46 right or left in FIG. 21, seal touches and then begins compressing against a part of concave region 62 between port 64 and region 66. As spool 4 translates further, seal 8 compresses sealingly against region 62 until the seal reaches point 70, where region 62 ends and straight cylindrical region 66 begins. As spool 4 translates still further, seal 8 slides along region 66, where the seal is most fully, and still sealingly, compressed.

Figure 16:
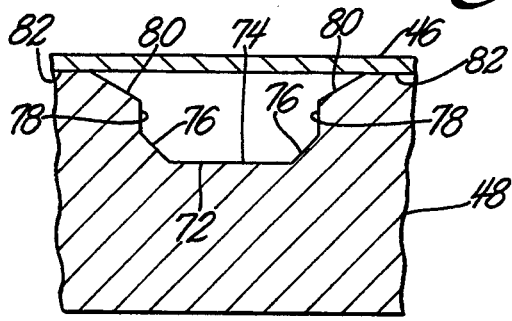
FIGS. 16 through 18 are alternate cross sectional shapes for the confinement sleeve channel shown in FIG. 13.
Figure 17:
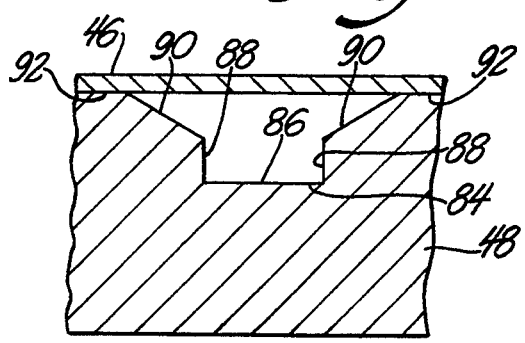
Figure 18:
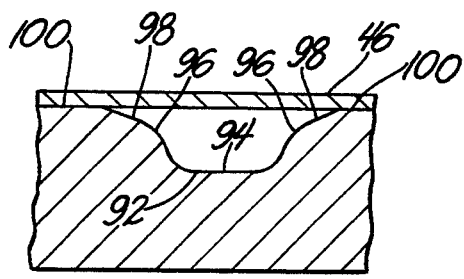

FIG. 16 shows an alternate channel 72 for outer sleeve 48, whose cross section can replace the cross section of either channel 54 or channel 56. Channel 72 has straight cylindrical bed 74 generally parallel to valve sleeve 46 or parallel to the longitudinal axis thereof. Adjoining bed 74 are radially inner bevels 76 that border side wall segments 78, these segments preferably normal to bed 74. Radially outer bevels 80 extend between segments 78 and a straight cylindrical interface 82 between the inner diametrical surface of confinement sleeve 48 and the outer diametrical surface of valve sleeve 46. FIG. 17 shows in transverse cross sectional another alternate channel 84 for sleeve 48 having straight cylindrical bed 86 and adjoining side walls 88 normal to bed 86. Bevels 90 extend between walls 88 and interface 92 between the inner diametrical surface of sleeve 48 and the outer diametrical surface of sleeve 46. FIG. 18 shows in cross section still a third alternate channel 92 having a flat or very slightly arcuate bed section 94 smoothly transitioning to S-shaped wall sections 96. Sections 96 terminate in outwardly flared zones 98 that extend to the interface 100 between sleeves 46 and 48.

Figure 23:
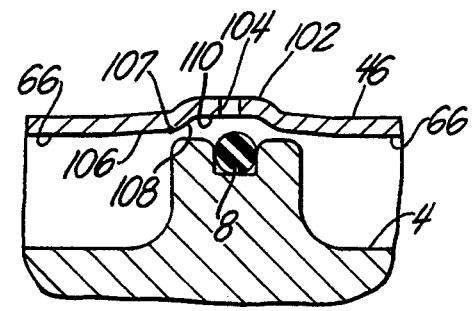
FIG. 23 is a sectional detail view showing juxtaposition of a valve seal with a port of a valve sleeve made by a second alternate of my method.

FIG. 23 shows the shape of hat region 102, which is analogous to FIG. 20's region 62. Region 102 is formed by using channels 72, 84 or 92. At the peripheral mouth or opening of hat region 102 is flare zone 106, which is flat or very slightly curved, and which can form an angle between 5° and 20° with the inner diametric surface of straight cylindrical region 66. Integrally adjacent flare zone 106 and smoothly transitioned therefrom is gently curved, generally "S" shaped side wall zone 108. In turn, zone 108 integrally joins, and transitions smoothly with, radially outermost zone 110. Zone 110 is either flat or very slightly curved, can be oriented at or about 0° to the inner diametric surface of region 66, and has port 104 extending through it. A section of wall zone 108 between but not immediately adjacent zones 106 and 110 can be oriented at an angle of 30° to 50° relative to the inner diametric surface of region 66.

As spool 4 translates in sleeve 46 to the right or left in FIG. 23 along the sleeve's axis, seal 8 first grazingly contacts and then compresses upon side wall zone 108. When spool 4 has reached nexus 107 between zones 108 and 106, seal 8 sufficiently compresses against zone 108 to stop most (say 90% to 99%) or stop essentially all fluid leakage therepast for anticipated valve pressures. As spool 4 translates further, it becomes increasingly compressed by zone 106 so that seal 8 completely stops flow therepast, and seal 8 ultimately reaches maximum compression at region 66. Normally, most seal compression occurs as the seal translates along zone 106, whose inner diametric surface is longer and more gently ramped along sleeve 46 than is zone 108. The configuration of concave sector 102 thus allows a relatively fast transition between a fully blocked and a fully open state for a valve at port 104 while minimizing the potential for damage during compression to seal 8.

Figure 19A:
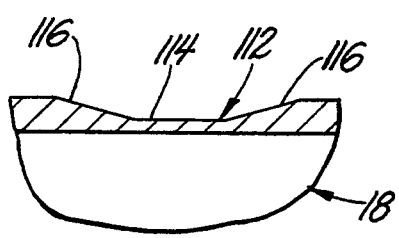
FIG. 19A is an alternate shape for the exterior tube channels shown in FIGS. 3 and 4.
Figure 19B:
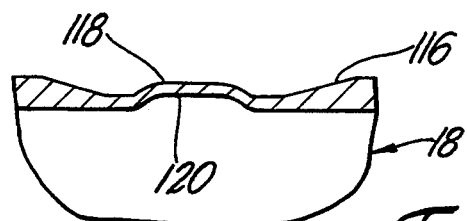
FIG. 19B is a cross section of a concavity in the tube formed at the tube channel of FIG. 19A.

FIG. 19A shows a transverse section of modified channel 112 which can replace channels 20 or 22 of sleeve 18 in FIG. 3. Channel 112 is shallow and has a straight cylindrical bed 114 between sloped sides 116, and will assume a hat shaped bulge 118 shown by FIG. 19B once sleeve 18 is pressurized as described previously. The inner surface 120 of bulge 118 will have a similar shape to the analogous inner surface of concave region 102 in FIG. 23.

Figure 22:
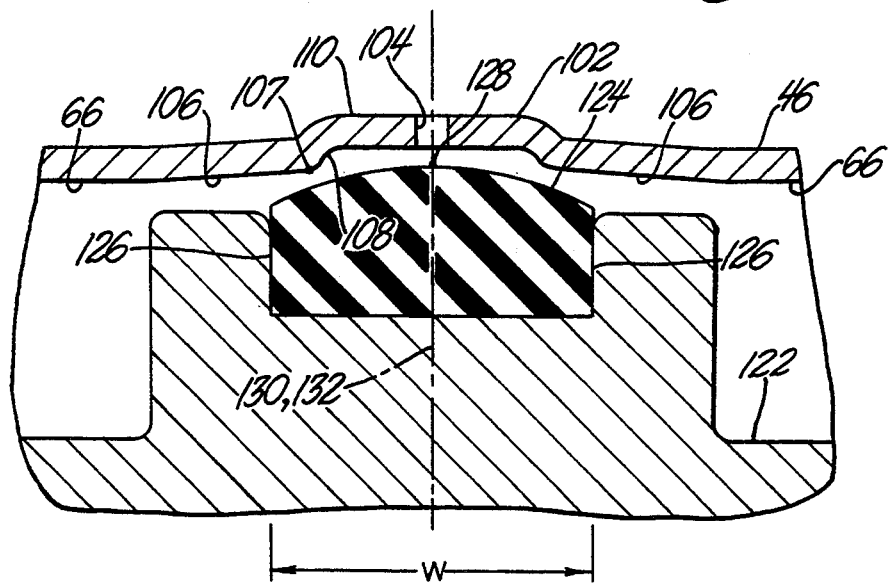
FIG. 22 is a sectional detail view of an alternate seal structure for use with valve sleeves made by my method.
Figure 24:
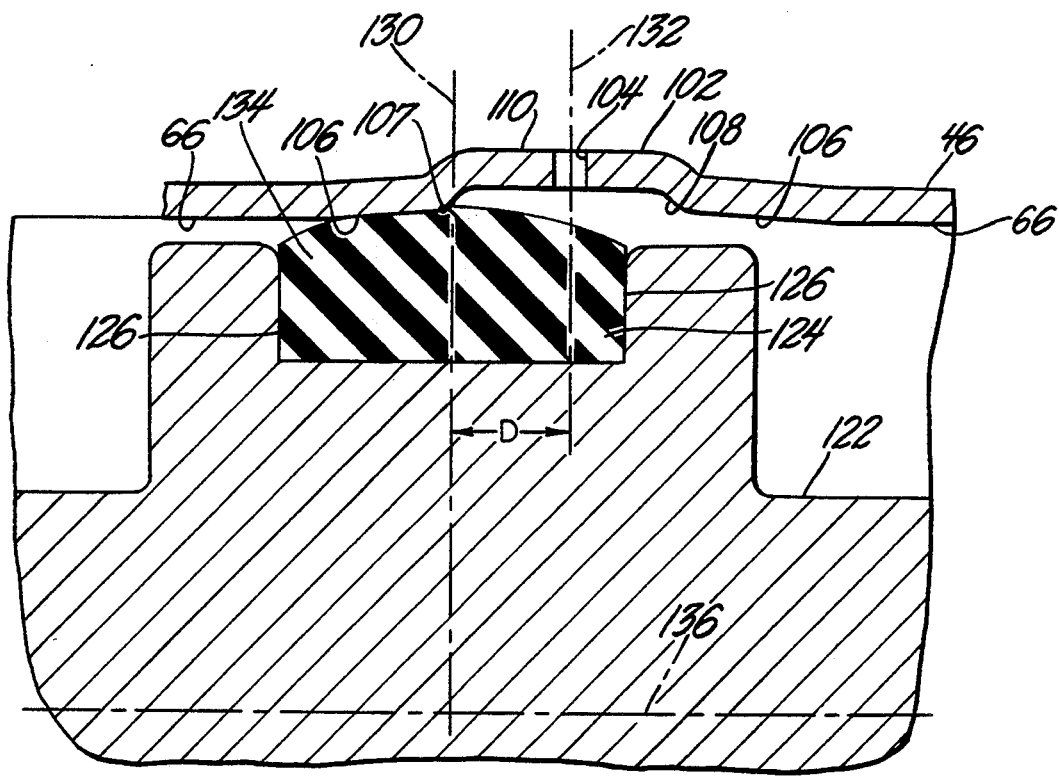
FIG. 24 is another sectional detail view of the alternate seal structure of FIG. 22, the seal having been moved from a "valve open" position of FIG. 22 to a "valve closed" position in FIG. 24.

In FIG. 22 is alternate seal 124 and neighboring structure of modified spool 122, which respectively replace seal 8 and spool 4 in FIG. 23. Seal 124 has an axial width "W" greater than the combined axial widths of outermost zone 110 and sidewall zone 108. The seal's axial ends 126 align with flare zones 106 when seal 124 aligns with port 104 as shown in FIG. 22, where seal center line 130 registers with port center line 132. The convex surface of the seal has a center 128 which is more radially outward than point 107. Consequently center 128 has elastically compressive interference with zone 108 if seal 124 translates axially right or left in FIG. 22. FIG. 24 shows this interference, which conforms seal portion 134 to zone 106 to stop fluid flow therepast, portion 134 being at the convex surface of the seal between center 128 and end 126. In FIG. 24, the interface of portion 134 with zone 106 covers most, normally 60 to 90 per cent, of the area of zone 106 left of axis 130, and this interface is large enough to form a positive seal. Seal 124 needs to move only through distance "D" along axis 136 of sleeve 46 to go from a position where port 104 is completely blocked to a position where port 104 is completely open. Thus, the operation of port 104 is quick and accurate. The strain on the seal is relatively low due to the small amount of radially compressive interference thereon, which results in a relatively small amount of seal deformation relative to seal size.

Figure 25:
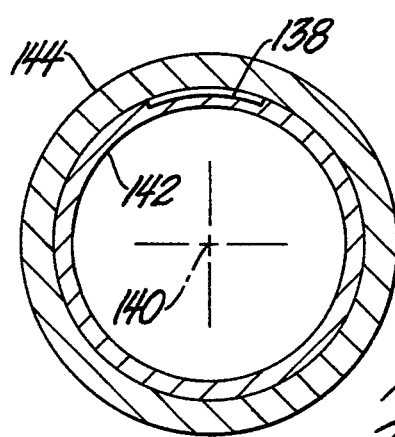
FIG. 25 is a radial section of a tube in a confinement sleeve, where the external sleeve channel runs along the tube axis.
Figure 26:
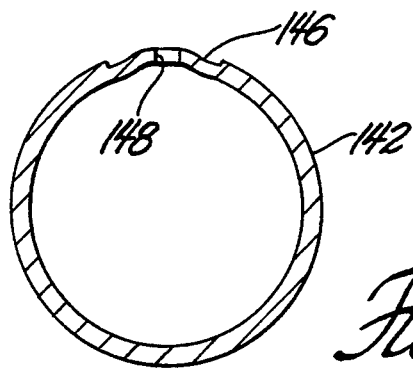
FIG. 26 is a radial cross section of a valve sleeve made from the tube in FIG. 25.

FIG. 25 shows a channel 138 along longitudinal sleeve axis 140 of valve sleeve 142 inserted in outer sleeve 144. FIG. 26 shows sleeve 142 after channel 138 has been deformed by pressure in accordance with previously discussed methods, whereby channel 138 becomes radially outward concavity or bulge 146. Port aperture 148 is drilled in the central part of bulge 146.

I do not desire to be limited to the exact details of construction or method shown herein since obvious modifications will occur to those skilled in the relevant arts without departing from the spirit and scope of the following claims.

I claim:

1. A method to fabricate a valve sleeve, comprising:
   providing a tube with a smooth inner peripheral surface;
   creating a channel on the tube recessed with respect to an outer peripheral surface of the tube, whereby a channelled region of a tube wall is thinner than other regions of the tube wall;
   placing the tube in an exterior sleeve so that the tube's outer peripheral surface at the other regions fits closely with an inner peripheral surface of the sleeve;
   pressurizing the tube to plastically deform the channeled region outward, whereby the channelled region forms a concavity in the inner peripheral surface of the tube;
   creating an aperture through the concavity.

2. A method for forming a sleeve of a valve, comprising:
   providing a metal tube having smooth inner and outer diametrical surfaces;
   forming a cross-sectionally wide, flat channel on the tube recessed with respect to the tube's outer diametrical surface so that a channelled region of the tube is thinner than other regions of the tube;
   placing the tube in a confinement sleeve whose inner peripheral surface conforms with the tube's outer diametrical surface, the inner peripheral surface defining a gap with the channelled region of the tube;
   pressurizing the tube to deform the channelled region outward into the gap so as to form both a concavity on the inner diametrical surface of the tube and a smoothly surfaced transition between the concavity and the other regions;
   removing the tube from the sleeve;
   forming a port aperture in an outer part of the concavity.

3. The method of claim 1 wherein the channel is a transversely cross-sectionally shallow arcuate channel curving around a longitudinal axis of the tube.

4. The method of claim 1 wherein the channel is a wide, flat annular channel centered on a longitudinal axis of the tube.

5. The method of claim 1 wherein:
   pressurizing the tube plastically deforms only the channelled region of the tube wall; and
   when the tube is pressurized, the other regions have elastic deformation limited by the confinement sleeve.

6. The method of claim 1 wherein the channel is configured to create a hat-shaped cross section of the concavity.

7. The method of claim 2 further including the steps of:
   placing a valve spool within the valve;
   placing an annular seal on the spool;
   radially dimensioning the seal to interfere with the other regions of the tube but not with a radially outermost zone of the concavity where lies the aperture.

8. The method of claim 2 wherein the process of deforming the channelled region includes the steps of:
   forming a radially outermost zone of the concavity faced inward radially with respect to the tube;
   forming a flare zone smoothly integral with the other regions of the tube and disposed at a first angle relative to the other regions;
   forming a sidewall zone between the outermost zone and the flare zone, the sidewall zone smoothly integrated with the outermost zone and the flare zone;
   disposing at least a portion of the sidewall zone at a second angle relative to the other regions greater than the first angle.

9. The method of claim 8, including the steps of:
   placing a valve spool within the tube;
   placing a seal on the spool;
   radially dimensioning the seal to interfere with the other regions but not the radially outermost zone;
   shaping the sidewall zone so that one portion of the sidewall at the outermost zone is radially more outward than another portion of the sidewall;
   aligning a radially outer seal part to be radially coextensive with the one portion during a seal free state.

10. A method for forming a valve sleeve of a valve, comprising:
    providing a metal tube having smooth inner and outer diametrical surfaces;
    providing a confinement sleeve whose inner peripheral surface conforms with the tube's outer diametrical surface;
    forming a wide, flat channel in the confinement sleeve recessed with respect to the confinement sleeve's inner diametrical surface;
    placing the tube in the confinement sleeve, an unsupported region of the tube defining a gap with a channelled region of the confinement sleeve;
    pressurizing the tube to plastically deform the unsupported region of the tube radially outward into the gap, such that a concavity on the inner diametrical surface of the tube is formed;

forming a smoothly surfaced transition between the concavity and a neighboring section of the inner diametrical surface;

removing the sleeve from the tube;

placing a port aperture in a radially outer zone of the concavity.

11. The method of claim 10 wherein the process of pressurizing the tube to plastically deform the unsupported region includes:

forming a flare zone smoothly integral with other regions of the tube that are supported by the confinement sleeve, the flare zone disposed at a first angle relative to the other regions;

forming a sidewall zone between the radially outer zone of the concavity and the flare zone, the sidewall zone smoothly integrated with the radially outer zone and the flare zone;

disposing at least a portion of the sidewall zone at a second angle relative to the other regions, the second angle being greater than the first angle.

12. The method of claim 11 wherein the sidewall zone is formed to have a generally S-shaped cross section.

13. The method of claim 11 further including:

placing a valve spool within the sleeve;

placing an elastic seal on the spool between the spool and the inner diametric surface of the tube;

giving the seal a curved surface axially wider relative to a tube axis than the radially outer zone of the concavity;.

configuring the seal so that a central, radially outermost part of the curved surface axially opposes the sidewall zone while the seal is free of the tube.

14. The method of claim 13 including the step of shaping the concavity so that:

at a first seal position, the central part opposes the port aperture and the seal is spaced from the concavity;

at a second seal position, the central part covers most of the sidewall zone at one axial side of the aperture.

* * * * *